(12) United States Patent
Shaw et al.

(10) Patent No.: US 12,742,696 B2
(45) Date of Patent: Sep. 22, 2026

(54) PORTABLE CALIBRATION TOOL

(71) Applicant: ENERPAC TOOL GROUP CORP., Milwaukee, WI (US)

(72) Inventors: Robin Shaw, Whitley Bay (GB); Andrew Dumelow, North Shields (GB)

(73) Assignee: Enerpac Tool Group Corp., Milwaukee, WI (US)

( * ) Notice: Subject to any disclaimer, the term of this patent is extended or adjusted under 35 U.S.C. 154(b) by 576 days.

(21) Appl. No.: 18/026,636

(22) PCT Filed: Oct. 15, 2021

(86) PCT No.: PCT/US2021/055263
§ 371 (c)(1),
(2) Date: Mar. 16, 2023

(87) PCT Pub. No.: WO2022/082032
PCT Pub. Date: Apr. 21, 2022

(65) Prior Publication Data

US 2024/0027294 A1 Jan. 25, 2024

Related U.S. Application Data

(60) Provisional application No. 63/177,298, filed on Apr. 20, 2021, provisional application No. 63/092,071, filed on Oct. 15, 2020.

(51) Int. Cl.
*G01L 25/00* (2006.01)
*B25B 23/145* (2006.01)

(52) U.S. Cl.
CPC ........ *G01L 25/003* (2013.01); *B25B 23/1456* (2013.01)

(58) Field of Classification Search
CPC .................................................... G01L 25/003
See application file for complete search history.

(56) References Cited

U.S. PATENT DOCUMENTS 4,322,965 A 4/1982 Bickford
4,761,989 A * 8/1988 McDevitt ............ H02K 49/106 81/473

(Continued)

FOREIGN PATENT DOCUMENTS

CA 2925579 C * 7/2018 .......... G01L 25/003
CN 204535920 8/2015

(Continued)

OTHER PUBLICATIONS

International Search Report and the Written Opinion for PCT/US2021/055263 dated Feb. 7, 2022.

(Continued)

*Primary Examiner* — Jamel E Williams
(74) *Attorney, Agent, or Firm* — ANDRUS INTELLECTUAL PROPERTY LAW, LLP

(57) ABSTRACT

A tool assembly configured to calibrate a hydraulic torque wrench and a method of calibrating a wrench. The tool assembly may generally include a tool including a head, a base, an arm extending between the head and the base, and a strain gauge configured to sense a strain exerted on the tool; and an electronic processor in communication with the strain gauge and configured to calculate a torque based on a sensed strain.

32 Claims, 9 Drawing Sheets

(56) References Cited

U.S. PATENT DOCUMENTS

| | | | | |
|---|---|---|---|---|
| 5,181,425 | A * | 1/1993 | Livingston | G01L 25/003 73/862.08 |
| 7,428,845 | B1 | 9/2008 | Collins | |
| 7,757,540 | B2 * | 7/2010 | Dabrowski | G01L 25/003 73/1.12 |
| 9,664,583 | B2 * | 5/2017 | Wu | G01L 25/003 |
| 10,317,303 | B2 * | 6/2019 | Spirer | G01L 25/003 |
| 2009/0222222 | A1 * | 9/2009 | Lucke | G01L 25/003 702/41 |
| 2016/0123832 | A1 | 5/2016 | Wu | |
| 2017/0131171 | A1 | 5/2017 | Spirer | |
| 2019/0105762 | A1 * | 4/2019 | Hughes | B25B 21/005 |

FOREIGN PATENT DOCUMENTS

| | | |
|---|---|---|
| JP | 2014-226776 | 12/2014 |
| KR | 10-1453764 | 10/2014 |

OTHER PUBLICATIONS

Extended European Search Report for EP Publication No. 4229377, dated Oct. 15, 2024.

International Preliminary Report on Patentability for PCT/US2021/055263 dated Apr. 27, 2023.

* cited by examiner

PORTABLE CALIBRATION TOOL

CROSS-REFERENCE TO RELATED APPLICATIONS

This application is the U.S. national stage application of International Application PCT/US2021/055263, filed Oct. 15, 2021, which international application was published on Apr. 21, 2022, as International Publication WO 2022/082032. The International Application claims the benefit of U.S. Patent Application No. 63/092,071, filed Oct. 15, 2020, and of U.S. Patent Application No. 63/177,298, filed Apr. 20, 2021, all of which applications are hereby incorporated by reference in entirety.

FIELD

The present disclosure relates to industrial tools and, particularly, to a calibration tool for use with wrenches.

SUMMARY

Industrial tools, such as hydraulic torque wrenches, use pressurized fluid to apply large torques to a workpiece (e.g., fastener, nut, etc.). In particular, application of pressurized fluid to a piston drives a socket to rotate in a first direction. The amount of torque applied by the wrench may need to be adjusted or calibrated.

In one independent aspect, a tool assembly configured to calibrate a hydraulic torque wrench may be provided. The tool assembly may generally include a tool having a head, a base, an arm extending between the head and the base, and a strain gauge configured to sense a strain exerted on the tool; and an electronic processor in communication with the strain gauge and configured to calculate a torque based on a sensed strain.

In another independent aspect, a calibration system configured to calibrate a hydraulic torque wrench may be provided. The wrench may include a housing, a fluid actuator, and a driver supported by the housing and driven by the fluid actuator. The system may generally include a tool assembly removably coupled to the wrench, the tool assembly including a working portion configured to engage the driver, a sensor configured to sense a condition on the tool during calibration, and an electronic processor in communication with the sensor and configured to calculate a torque based on a sensed condition, an input of the wrench being adjustable based on the torque.

In yet another independent aspect, a method of calibrating a hydraulic torque wrench may be provided. The method may generally include engaging a head of a tool with a drive element of the wrench; engaging a base of the tool with a reaction portion of the wrench; with a sensor, sensing a condition of the tool based on torque exerted by the wrench on the tool; and, with an electronic processor, receiving from the sensor a signal indicative of a sensed condition, and calculating a torque based on the sensed condition.

Other independent aspects may become apparent by consideration of the detailed description, claims, and accompanying drawings.

DETAILED DESCRIPTION

Figure 1:
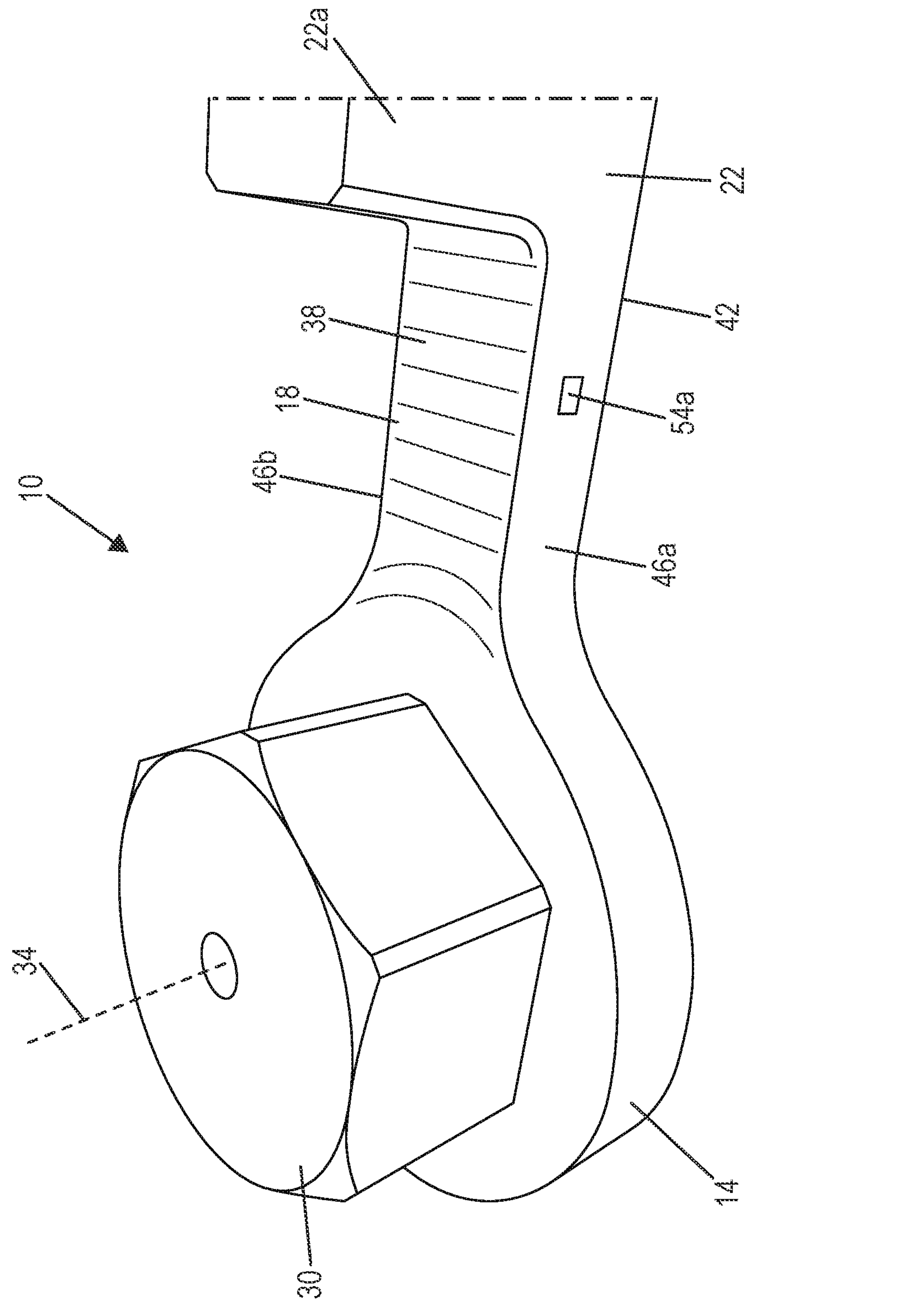
FIG. 1 is a perspective view of a portable calibration tool.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 2:
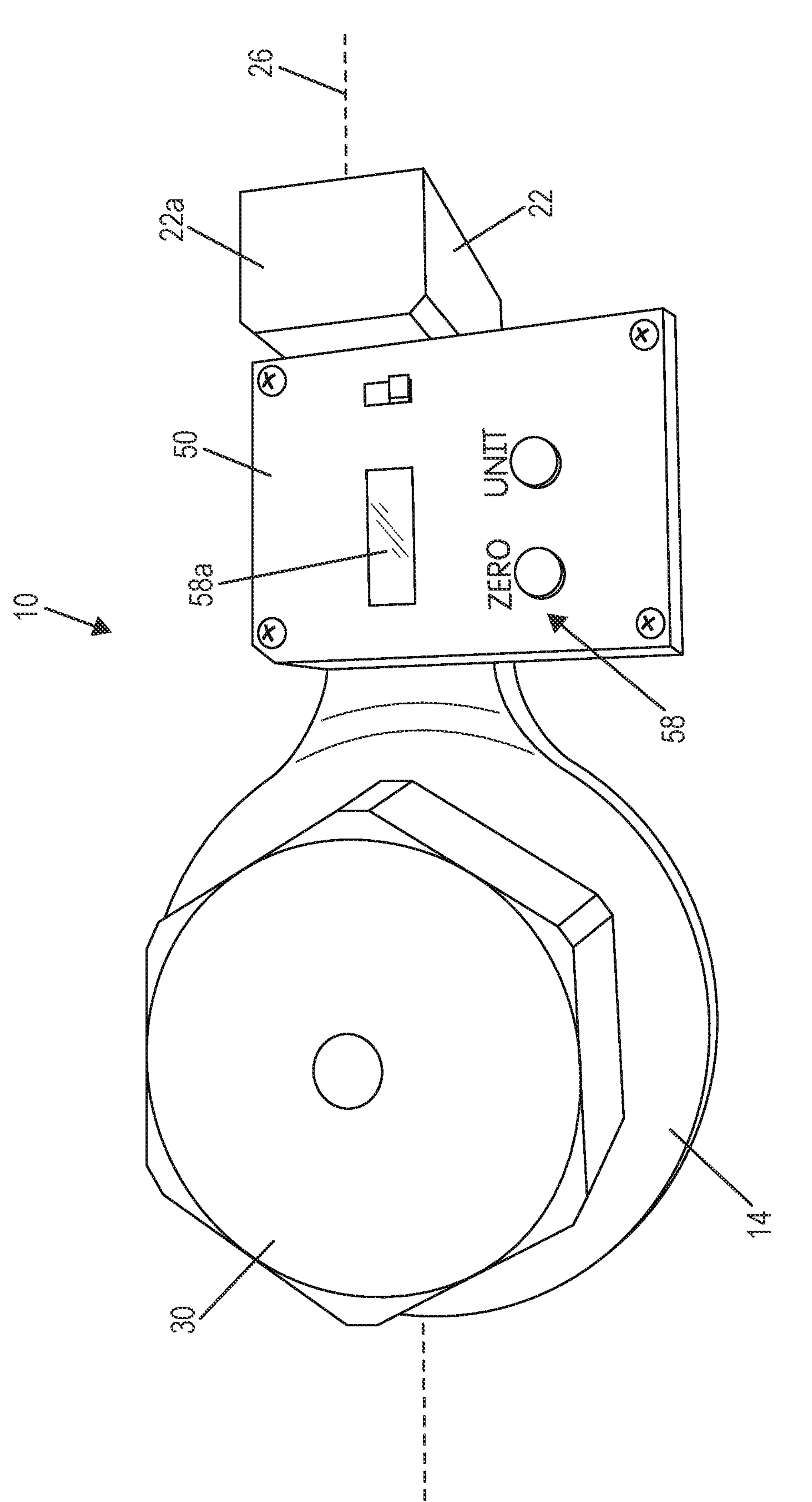
FIG. 2 is a perspective view of a tool assembly including the tool of FIG. 1 and a measurement module.
Figure 3:
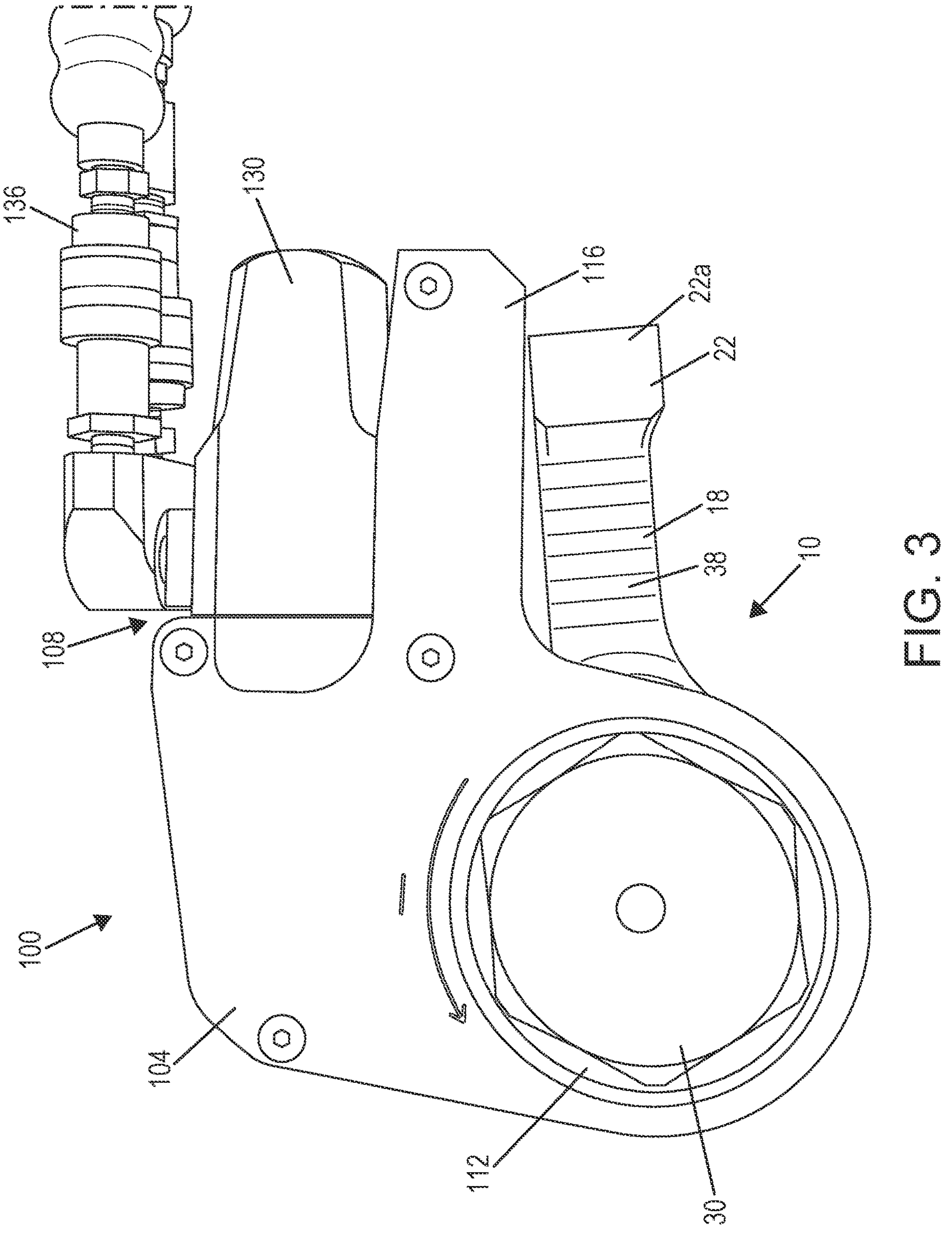
FIG. 3 is a perspective view of the tool of FIG. 1, illustrated coupled to a hydraulic torque wrench.

FIGS. 1-4 illustrate a portable calibration tool 10 for calibrating a hydraulic torque wrench 100 (see FIG. 3). The illustrated tool 10 includes a head portion 14, an arm 18, and a reaction or base portion 22. The arm 18 extends between the head portion 14 and the base portion 22 and along an arm axis 26 of the tool 10. In the illustrated construction, the head portion 14, the arm 18 and the base portion 22 are integrally formed as a unitary piece; however, in other constructions (not shown), one or more of these components of the tool 10 may be separate from and connected to the other component(s).

Figure 4:
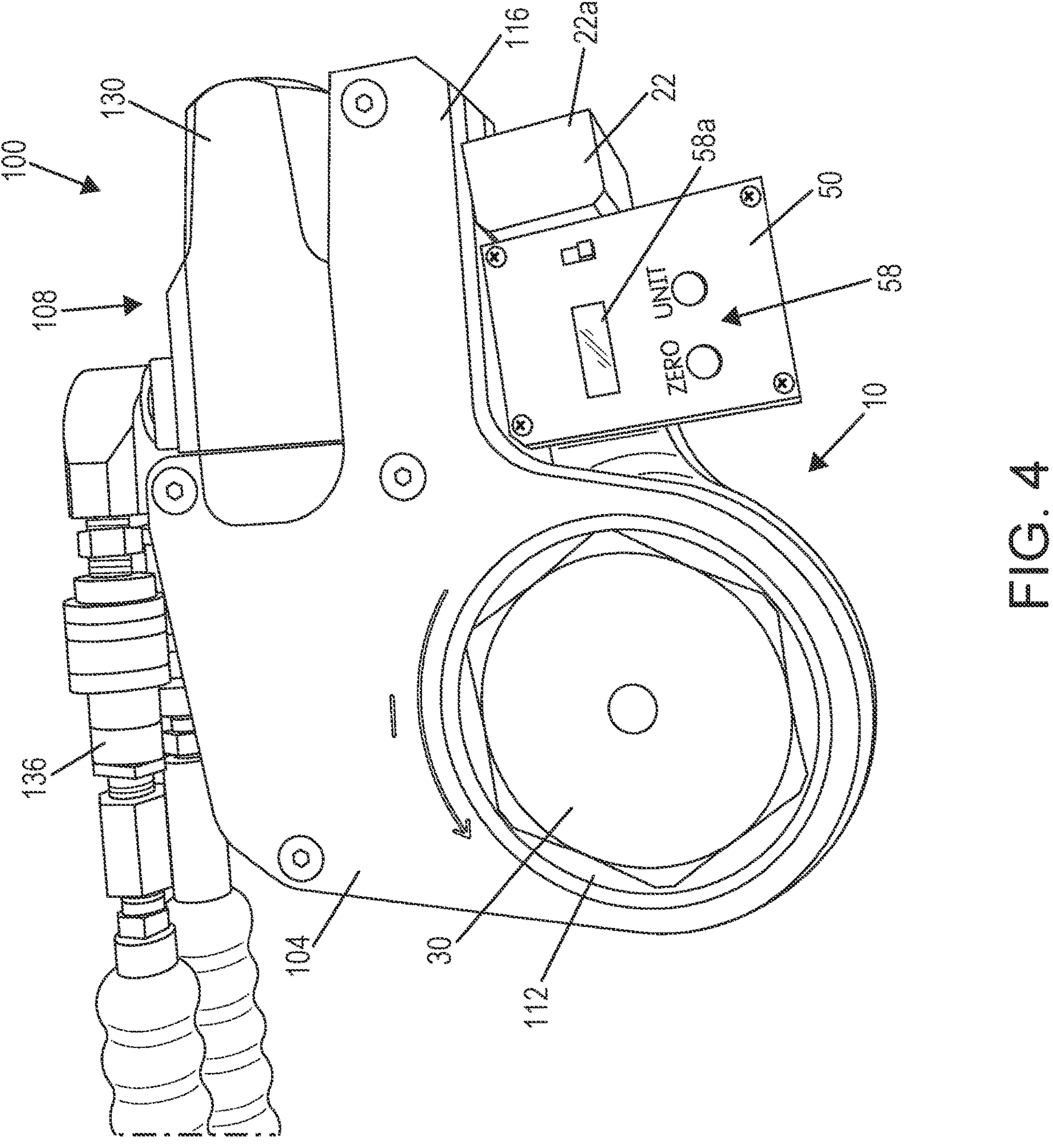
FIG. 4 is a perspective view of the tool assembly as shown in FIG. 2, illustrated coupled to the wrench.

In the illustrated construction, the head portion 14 includes a working portion or output member 30. The output member 30 defines an output axis 34 substantially perpendicular to the arm axis 26. The output member 30 has a polygonal (illustrated as hexagonal) head shaped and sized to fit within a corresponding socket 112 of the wrench 100 (FIG. 4).

In some constructions (not shown), the output member 30 may include a different shape, such as a square shape. In other constructions (not shown), the output member 30 may include an opening (or may be configured as a bore within the body 14) for receiving a drive shaft of the wrench 100. Furthermore, in some constructions (not shown), the output member 30 may be removable and replaceable, allowing various types of output members of various shapes, sizes, configurations, etc., to be removably coupled to the tool 10 for engagement with complementary drive elements of a wrench 100.

In the illustrated construction, the arm 18 has a generally rectangular cross-section with a top wall 38, a bottom wall 42, a first sidewall 46*a*, and an opposite second sidewall 46*b*. The sidewalls 46*a*, 46*b* extend between the top wall 38 and the bottom wall 42. The top wall 38 is sized to receive a measurement module 50 (FIG. 2), which is removably coupled to the tool 10 (e.g., to the arm 18 between the head portion 14 and the base portion 22).

A sensor is configured to sense a condition of the tool 10. In the illustrated constructions, the sensor includes one or more strain gauges 54 coupled to the tool 10. As shown in FIG. 1, a first strain gauge 54*a* is coupled to the first sidewall 46*a*, and a second strain gauge (not shown) is coupled to the second sidewall 46*b*. The strain gauges 54 are coupled to and configured to detect a strain the respective sidewalls 46 in response to a bending force or moment applied to the sidewalls 46 when a torque is exerted on the tool 10 by the wrench 100.

Figure 6:
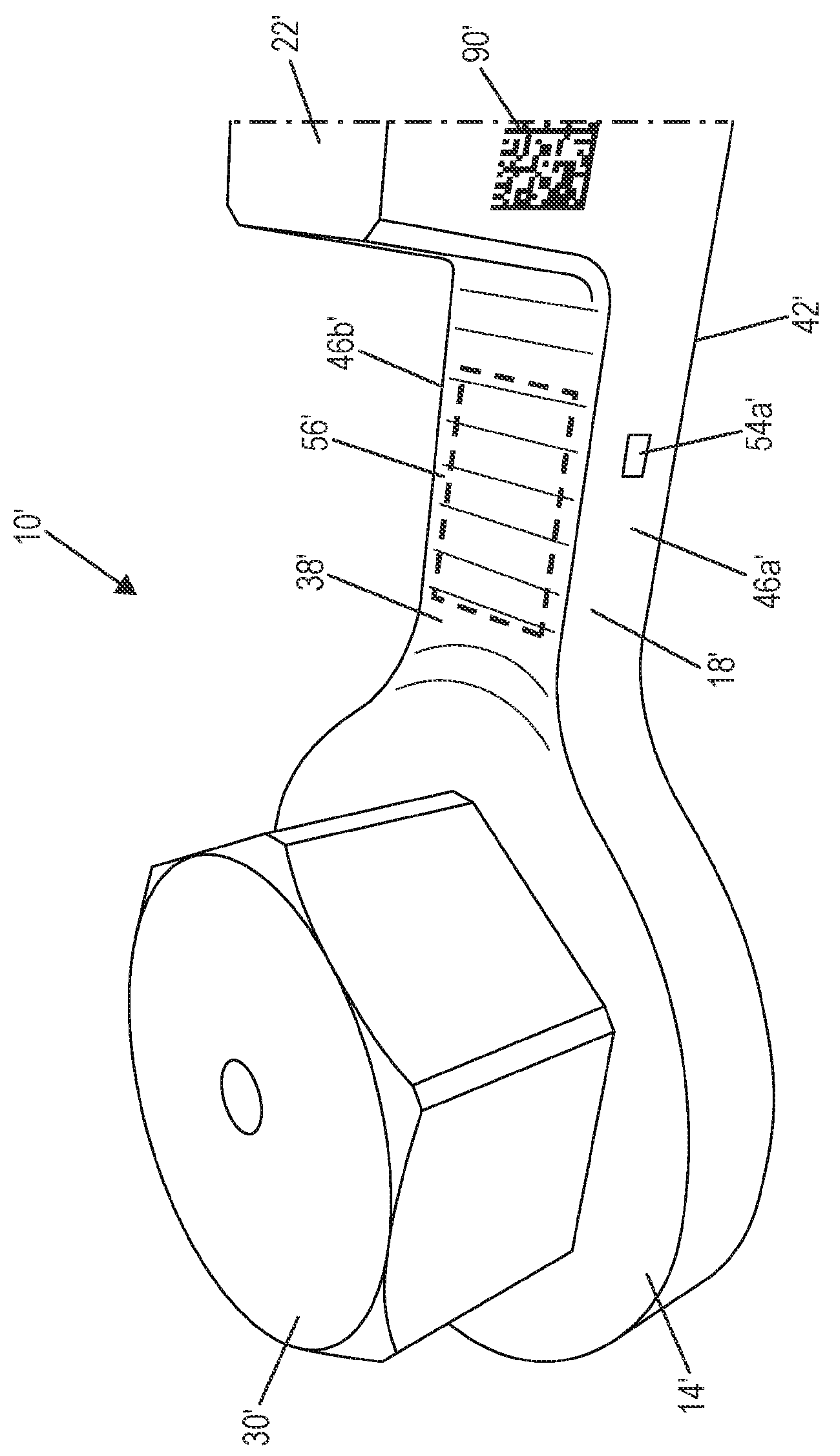
FIG. 6 is a perspective view of an alternative construction of a portable calibration tool assembly.

In some constructions (not shown), the tool 10 may include fewer or additional strain gauges 54 and/or the strain gauge(s) 54 may be positioned in different locations on the tool 10 (e.g., on the head portion 14" (see FIG. 6). In still further constructions (not shown), the strain gauge(s) 54 may be positioned within the arm 18 (e.g., on an internal portion of the arm 18), rather than on the sidewalls 46*a*, 46*b* to, for example, protect the strain gauge(s) 54 from impact.

As shown in FIG. 2, the measurement module 50 includes a control system 56 in electrical communication with the strain gauges 54. In the illustrated construction, the strain gauges 54 transmit respective signals (e.g., voltage signals) representative of (e.g., proportional to the magnitude of) strain experienced by respective sidewalls 46*a*, 46*b*. The signals representative of the sensed strain are indicative of torque applied to the output member 30 by the wrench 100.

The base portion 22 is positioned at a distal end of the tool 10 and includes structure (e.g., a projection 22*a*) operable to abut against a portion (e.g., a reaction surface) of the wrench 100. When the tool 10 is coupled to the wrench 100 and the wrench 100 is actuated, the base portion 22 engages against the reaction portion of the wrench 100.

In the illustrated construction, the measurement module 50 also includes a user interface 58 with a display 58*a* in communication with the controller and configured to display conditions or data associated with the tool 10, the strain gauges 54, etc., in real-time or substantially real-time. For example, the display may be configured to display the measured voltage signal readings and/or the calculated torque values. The display 58*a* is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

Figure 5:
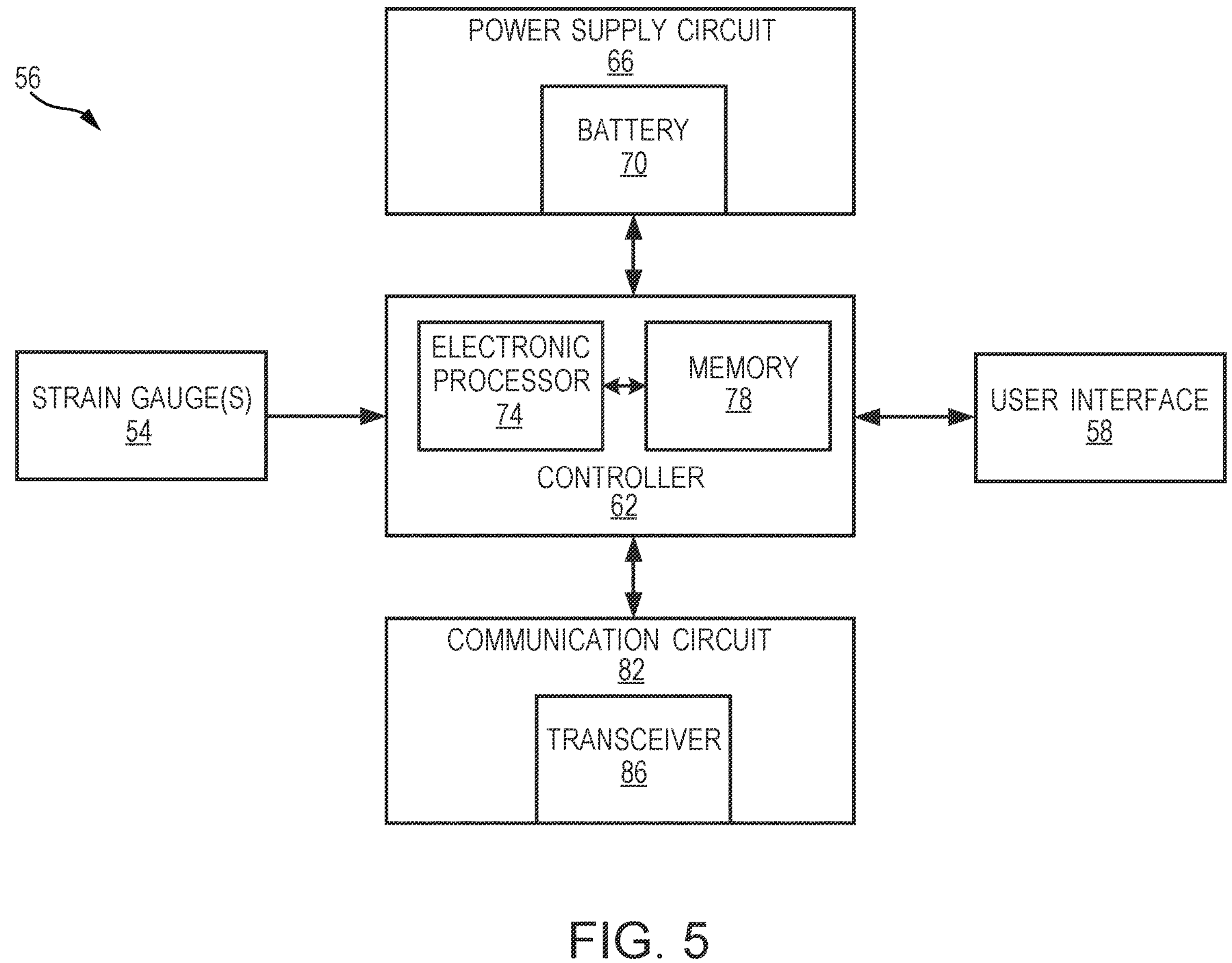
FIG. 5 is a block diagram of a control system of the tool assembly.

The control system 56 includes (see FIG. 5) a controller 62 electrically and/or communicatively connected to a variety of modules or components. For example, the controller 62 may be connected to a user-interface 58, the strain gauges 54, a power supply 66 (including a power source (e.g., a battery 70)), etc. The controller 62 includes a plurality of electrical and electronic components that provide power, operational control, and protection to the components and modules within the controller 62 and/or the measurement module 50. For example, the controller 62 includes, among other things, the electronic processor 74 (a programmable electronic microprocessor, microcontroller, or similar device), a memory 78, and an input/output (I/O) interface (e.g., a communication circuit 82). The electronic processor 74 is communicatively coupled to the memory 78 and the I/O interface. The electronic processor 78 is in communication with and receives signals from the strain gauges 54. The electronic processor 78 is configured to calculate a torque value based on the sensed strain.

The controller 62 may be implemented in several independent controllers each configured to perform specific functions or sub-functions. Additionally, the controller 62 may contain sub-modules that include additional electronic processors, memory, or application specific integrated circuits (ASICs) for handling communication functions, processing of signals, and application of the methods listed below. In other constructions, the controller 62 includes additional, fewer, or different components.

The memory 78 is, for example, a non-transitory, machine-readable memory. The memory 78 includes, for example, one or more non-transitory machine-readable media, a program storage area and a data storage area. The program storage area and the data storage area can include combinations of different types of memory, such as read-only memory (ROM) and random access memory (RAM). In some constructions, data is stored in a non-volatile random-access memory (NVRAM) of the memory. Various non-transitory computer readable media, for example, magnetic, optical, physical, or electronic memory may be used.

In the illustrated construction, the memory 78 includes an input controller engine (not shown; for example, software or a set of computer-readable instructions that determines functions to be executed in response to inputs) and wrench functions (for example, software or a set of computer-readable instructions that provide functionality for use in calibration of the wrench 100).

The electronic processor 74 is communicatively coupled to the memory 78 and executes software instructions that are stored in the memory 78, or stored in another non-transitory computer readable medium such as another memory or a disc. The software may include one or more applications, program data, filters, rules, one or more program modules, and other executable instructions. In some constructions, the memory 78 stores predetermined functions as well as other functions that are executed to provide wrench functionality, within the program storage area.

The I/O interface is communicatively coupled to components external to the controller 74 and coordinates the communication of information between the electronic processor 78 and other components. In illustrated examples, information received from an input component of the user interface 58, an external device, etc. is provided to the electronic processor 78 to assist in determining functions to be executed and outputs to be provided. The determined functionality is executed with the electronic processor 78 with the software located the memory.

In the illustrated construction, the communication circuit 82 is configured to communicate with external devices (e.g., a user device, such as a tablet, a personal computer, a mobile phone, etc., the strain gauge(s) 54, etc.). In the illustrated construction, the communication circuit 82 includes a transceiver 86 to provide wireless communication (e.g., Wi-Fi, Bluetooth, etc.) between the measurement module 50 (e.g., the controller 62) and the external device(s).

In other constructions, the communication circuit 82 may provide wired communication with an external device. The measurement module 50 may include a port (e.g., a USB port) to support a wired connection between the measurement module 50 and an external device, to facilitate charging of an internal power source (e.g., the battery 70), etc.

With reference to FIGS. 3-4, the hydraulic torque wrench 100 applies torque to a workpiece or fastener (e.g., nut, bolt, etc. (not shown)). The wrench 100 includes a cassette or housing 104 supporting a drive element 112, and the housing 104 is connectable to a drive unit 108 for actuating the drive element 112. In the illustrated constructions, the drive element 112 is a socket for receiving a portion of the workpiece; in other constructions (not shown), the drive element 112 may include a drive shaft.

The wrench 100 also includes a reaction portion or reaction arm 116 to secure the wrench 100 against rotation as torque is exerted on a workpiece. In the illustrated construction, the reaction arm 116 is integrally formed with the housing 104. In other constructions (not shown), the reaction arm may be removably attached to the housing 104.

The drive unit 108 includes a fluid actuator 130, and a working end (not shown). The working end is driven by the fluid actuator 130 and is coupled to a lever arm (not shown) supported on the housing 104.

The fluid actuator 130 includes a cylinder (not shown) supporting at least one piston (not shown). The fluid actuator 130 is in fluid communication with an external source of pressurized fluid (such as a pump (not shown)) via one or more fluid hoses 136. Pressurized fluid supplied to the fluid actuator 130 drives movement of the piston, which, in turn, drives movement of the working end between an extended position and a retracted position. Extension of the working end drives movement of the lever arm, which, in turn, drives the drive element 112 to rotate. Once the working end reaches an end of its extension, the working end is retracted, and the lever arm ratchets relative to the drive element 112.

In order to calibrate the wrench 100, the tool 10 is coupled to the wrench 100. A portion of the tool 10 (e.g., the second sidewall **46*b* of the arm 18) is positioned to abut against the reaction arm 116 of the wrench 100, and the output member 30 is positioned in the socket 112. In the illustrated construction, the user positions the measurement module 50 on the arm 18 of the tool 10, placing the controller in communication with the strain gauges 54** (e.g., via an electrical connection).

The user actuates the wrench 100, enabling pressurized fluid to be applied to the wrench 100. The pressurized fluid flows from the hydraulic pump to the fluid actuator 130, exerting a torque on the socket 112. The socket 112 transmits torque to the output member 30 of the tool 10. The base portion 22 abuts against the reaction arm 116, thereby creating a bending force on the sidewalls **46*a*, 46*b*. Each strain gauge 54 detects a strain (e.g., a voltage signal) exerted on the associated sidewall 46*a*, 46*b*, and transmits the strain values to the measurement detection module 50. Based on the detected strain values, the controller calculates the torque applied to the output member 30**.

The torque value is displayed on the display **58*a*. The measurement module 50** may additionally communicate the torque value to an external device (not shown) via the wired and/or wireless connection.

Based on information communicated to the user, the user may manually adjust an input (e.g., a pressure) of the pump in order to adjust the torque output generated by the wrench 100. In some constructions, the measurement module 50 may be in communication with a control system of the pump, such that, based on the torque output value calculated by the controller, the pump control system will adjust the input of the pump in order to set a desired or target torque output.

The control system of the pump may be programmed to automatically actuate in specified time intervals over a predetermined period of time, thereby consistently collecting torque data. Alternatively, the user may selectively actuate the pump, adjust the time intervals, and/or adjust the data collection time using the user device via the wireless connection.

FIG. 6 illustrates another construction of a portable calibration tool 10'. The illustrated calibration tool 10' is similar to the calibration tool 10 described above and shown in FIGS. 1-4, and common elements have the same reference number "'". Reference is hereby made to the description of the calibration tool 10 shown in FIGS. 1-5 for the description of common features and elements of the tool 10' not included below.

The calibration tool 10' includes an onboard control system 56', rather than the separate and removable measurement module 50 with the control system 56, in order to calculate the torque value applied to the output member 30' of the tool 10' by the wrench 100. The control system 56' includes (see FIG. 5) the controller 62, which is electrically and/or communicatively connected to a variety of modules or components of the tool 10'. Strain gauge(s) 54' positioned on the tool 10' (e.g., on the arm 18') are coupled to the controller 62.

During a calibration operation, the strain gauge(s) 54' detect the strain (e.g., a voltage signal) exerted on sidewall (s) 46*a*', 46*b*' of the arm 18', and transmit the strain values to the controller 62. Based on the strain values, the controller 62 calculates to a torque value which is indicative of the torque applied to the output member 30'. As mentioned above, information relating to the calibration operation is communicated, under the control of the controller 62, to the user, to an external device, etc.

With continued reference to FIG. 6, a base portion 22' of the tool 10' may additionally include an identifier 90', illustrated on a side surface of the base portion 22'. In the illustrated construction, the identifier 90' is a quick response (QR) code; in other constructions (not shown), the identifier may include a bar code or a Data Matrix.

The identifier 90' includes a unique or encrypted ID code corresponding to the tool 10'. The identifier 90' is associated with the continuous, real-time calibration data collected by the controller 62. The identifier 90' is readable by a reader (e.g., a camera on a mobile device, a QR reader, etc.) that communicates the specific ID code via the wireless connection to a local area network (LAN) or via LTE cellular for storage and access by a server and a user device. A user may then continuously collect, store, and view the data via wireless communication.

Figure 7:
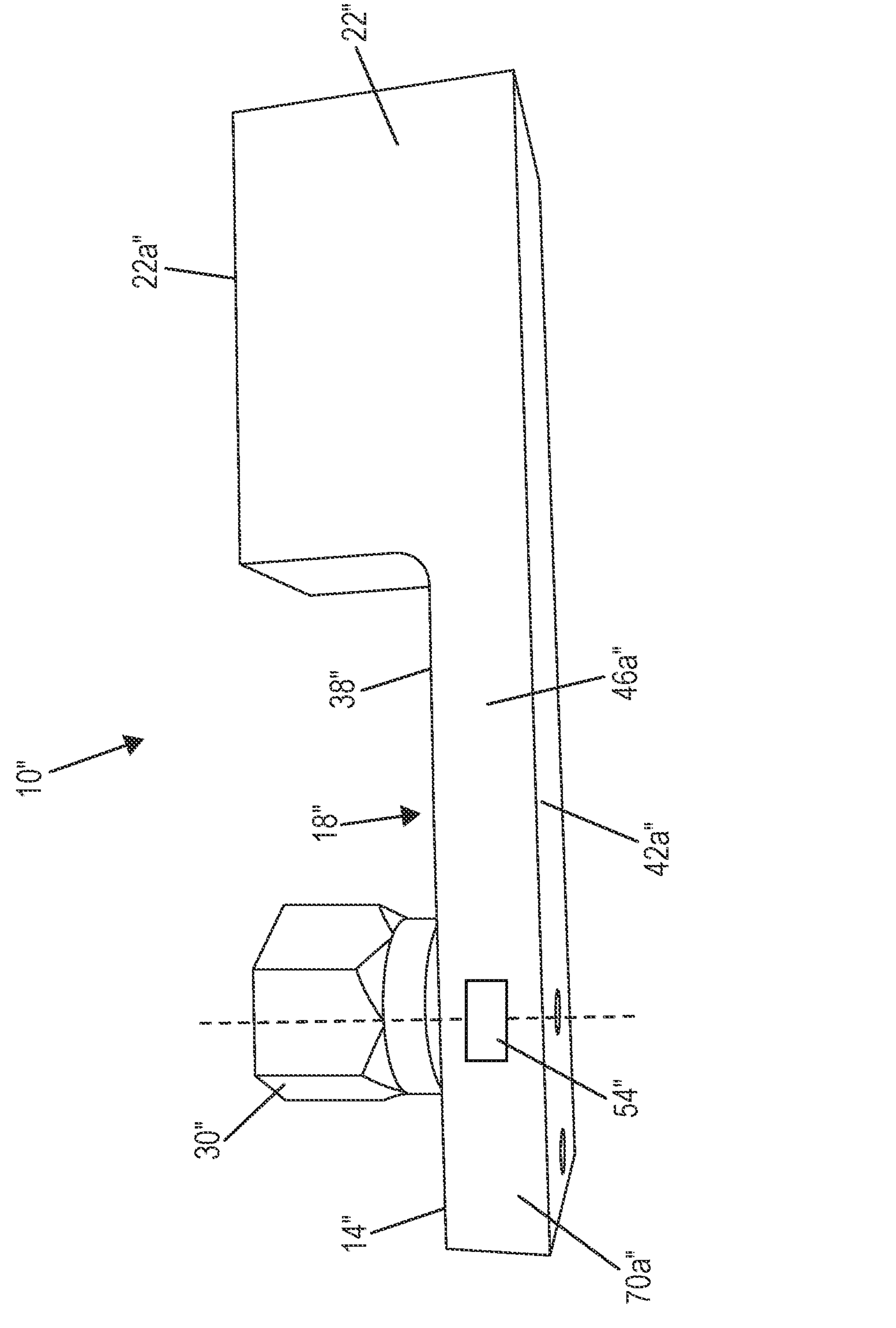
FIG. 7 is a perspective view of another alternative construction of a portable calibration tool.

FIG. 7 illustrates yet another construction of a portable calibration tool 10". The illustrated calibration tool 10" is similar to the tools 10, 10' described above and shown in FIGS. 1-6, and common elements have the same reference number """. Reference is hereby made to the description of the tools 10, 10' shown in FIGS. 1-6 for the description of common features and elements of the tool 10" not included below.

As illustrated, the strain gauge(s) 54" are positioned on opposite sidewalls adjacent a head portion 14" of the tool 10", rather than on an arm 18". More specifically, the first strain gauge 54*a*" is positioned on a first head sidewall 70*a*" of the head portion 14", and the second strain gauge (not shown) is positioned on a second head sidewall 70*b*" of the head portion 14". In other constructions (not shown), the tool 10" may include an opening (e.g., a hex shaped opening) to receive a drive shaft of the wrench 100, either instead of or in addition to the male output member 30".

In the illustrated constructions, the strain gauges 54" are arranged in a Half-Wheatstone Bridge. When the tool 10" is coupled to the wrench 100 and a torque is applied to the tool 10", one strain gauge (e.g., the first strain gauge 54*a*") experiences a tension force and the other strain gauge (e.g., the second strain gauge) experiences a compression force. The strain gauges 54" transmit respective voltage signals proportional to the magnitude of strain experiences by respective head sidewalls 70*a*", 70*b*" to a measurement module (see, e.g., the measurement module 228 shown in FIGS. 8-9). The measurement module calculates a voltage measured between the mid-points on each side of the Bridge. The measured voltage is indicative of torque applied to the output member 30" by the wrench 100, and the torque is displayed by the measurement module.

Figure 8:
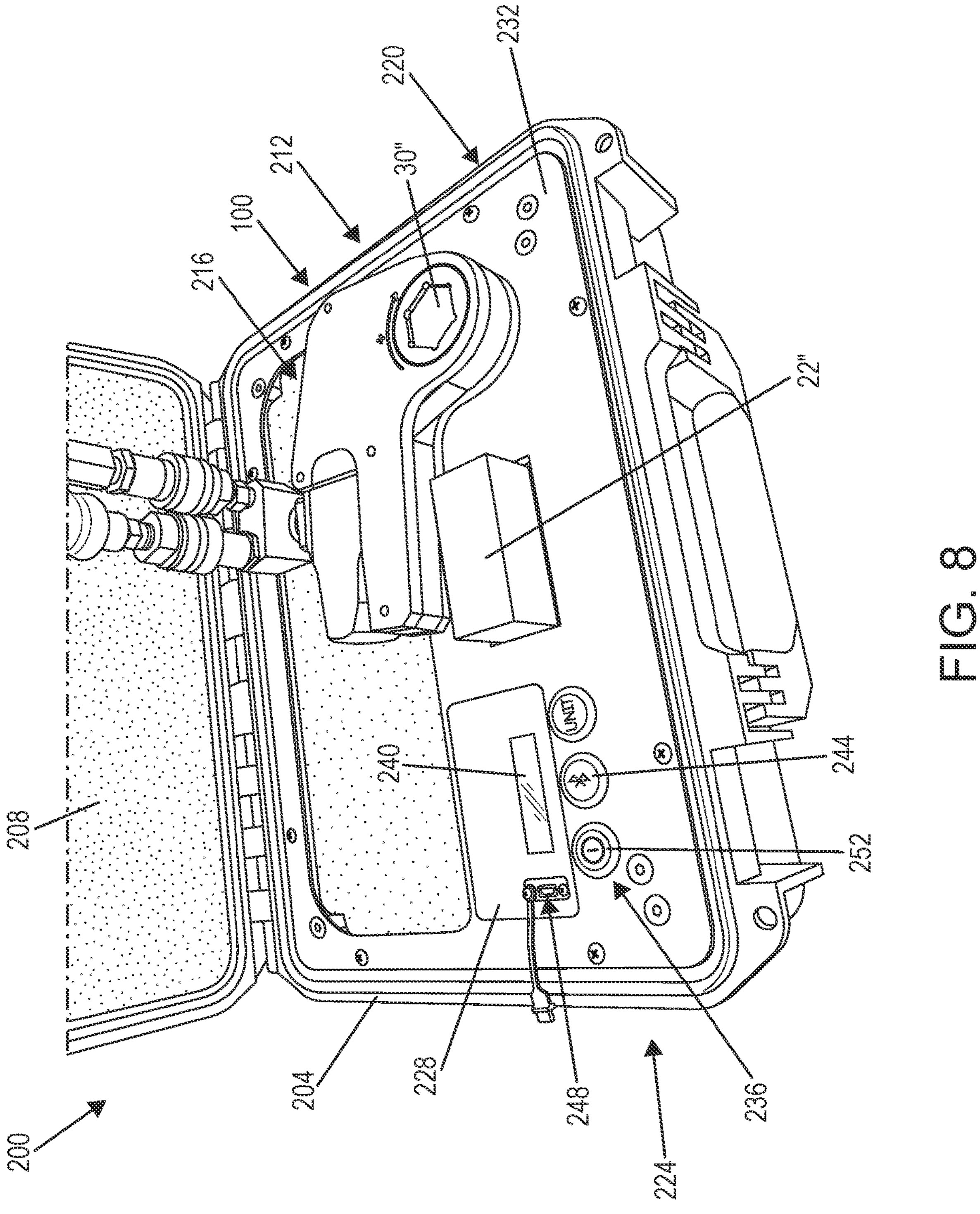
FIG. 8 is a perspective view of a portable case supporting a tool assembly including the tool of FIG. 7, illustrated with the wrench.
Figure 9:
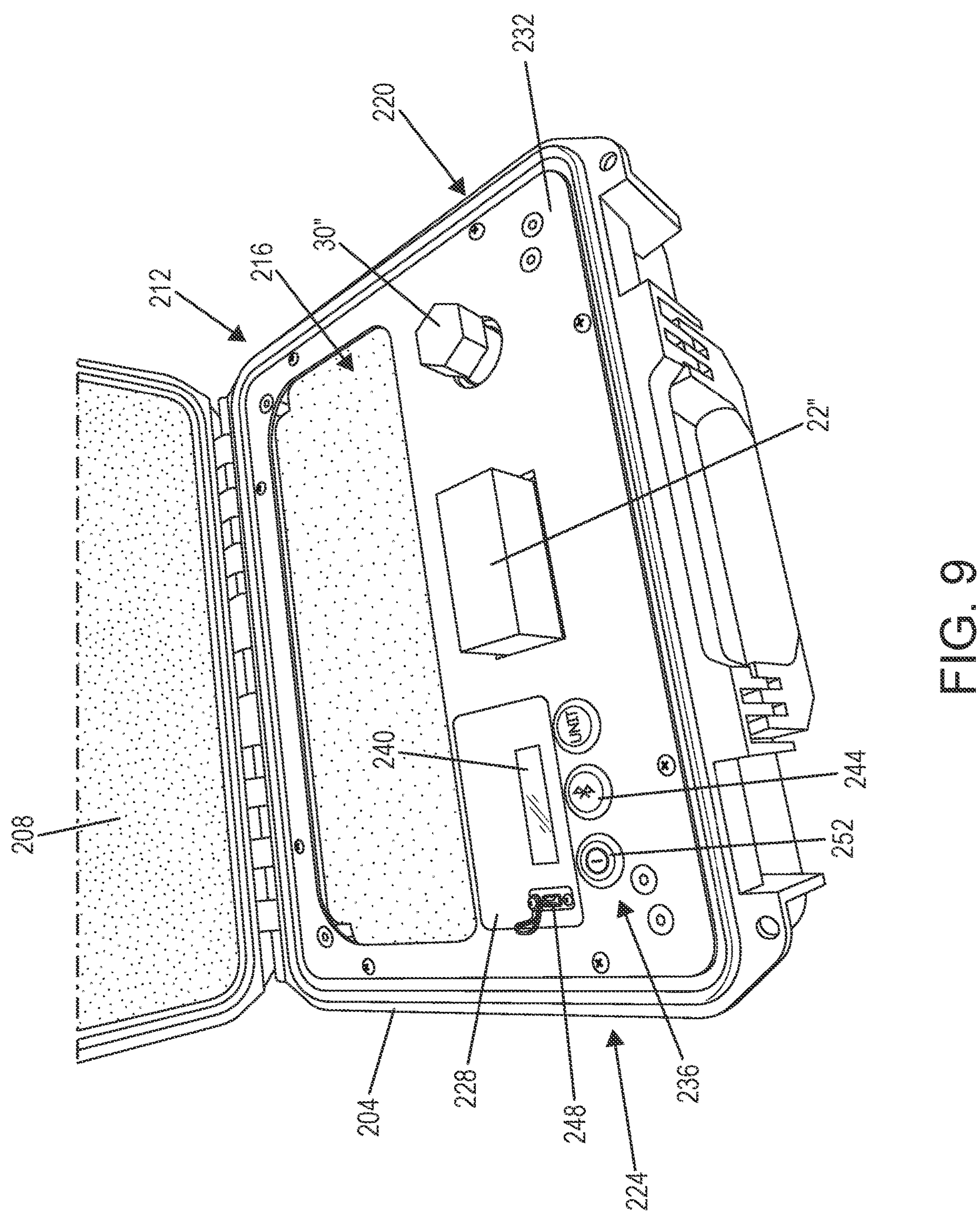
FIG. 9 is another perspective view of the case of FIG. 8, illustrated supporting the tool.

FIGS. 8-9 illustrate another construction in which the calibration tool 10" and a measurement module 228 are supported in a portable, compact container or case 200. In some constructions (see FIG. 8), the wrench 100 may be stored in the case 200 as well.

The case 200 includes a main housing 204 and a lid 208 defining a storage space 212 therein. In the illustrated construction, the storage space 212 includes a first region 216 (e.g., for storing the wrench 100), a second region 220 for storing the calibration tool 10", and a third region 224 for storing a measurement module 228. The case 200 is generally impact resistant and resists damage when dropped or exposed to harsh conditions. The case 200 additionally includes an on-board power source (e.g., a rechargeable lithium-ion battery (not shown)) configured to provide power to electronic components of the measurement module 228 (e.g., the control, communication components, etc.).

With continued reference to FIG. 8, the second region 220 of the storage space 212 includes a panel 232. In the illustrated construction, the panel 232 defines a first aperture shaped and sized to receive the base portion 22" of the tool 10" and a second aperture shaped and sized to receive the output member 30" of the tool 10". Therefore, in the illustrated construction, when the tool 10" is properly positioned within the second region 220 of the storage space 212, only the base portion 22" and the output member 30" protrude through the panel 232 for engagement with the wrench 100.

The measurement module 228 is secured within the case 200 and includes a user interface 236. The measurement module 228 is similar to the measurement module 50 described above with reference to FIGS. 1-5 and includes similar parts. Specifically, the measurement module 228 includes a controller 62 with an electronic processor 74 configured to receive signals from the strain gauge(s) 54" and calculating a torque value based on the strain signals.

In the illustrated construction, the user interface 236 includes a display 240 configured to display conditions or data associated with the strain gauges 54" in real-time or substantially real-time. The display 240 is substantially water-resistant and includes a user input device (e.g., a keypad) operable by a user. For example, the display 240 may be configured to display the measured strain signal readings and/or the calculated torque values. The display 240 is operable to display torque values in various measurement units (e.g., Newton-meter (N-m), pound-foot (lbf-ft), etc.) which may be selected by the user. In some constructions, the measurement module 228 is configured to measure voltage signal readings and/or calculated torque values with an accuracy within about 1%.

In the illustrated construction, the measurement module 228 further includes a wireless connection (e.g., Wi-Fi, Bluetooth, etc.) between the controller 62 and an external device (e.g., a tablet, a personal computer, a mobile phone, etc.). The user interface 236 includes an actuator 244 configured to enable the controller 62 to establish the wireless connection via Bluetooth. The communication circuit 82 may include a wireless communication device (e.g., the transceiver 86) for establishing a wireless connection to wirelessly communicate with the external device.

With continued reference to FIGS. 8-9, the measurement module 228 includes a port 248 (e.g., a USB port) to support a wired connection between the measurement module 228 and the external device and/or other components for communication, charging of the onboard power source (e.g., the battery 70), etc. The user interface 236 additionally includes a power actuator 252 configured to turn the measurement module 228 ON and OFF. The user interface 236 may further include an actuator to permit a user to change the units of measurement, the information being output, etc.

The case 200 is compact and portable, allowing a user to easily transport and store the tool 10" and the measurement module 228, along with a wrench 100. During operation, the tool may be positioned within the second region 220 of the storage space 212, and the wrench 100 is positioned within the first region 216.

When the tool 10" and the wrench 100" are in their respective positions, the base portion 22" of the tool 10" abuts against the reaction arm 116 of the wrench 100, and the output member 30" is positioned in the socket 112. The user turns on the measurement module 228 (e.g., via the power actuator 252) and connects the measurement module 228 with the tool 10" (e.g., via wires provided in the case 200, via a wireless connection, etc.). The user then actuates the wrench 100. The strain gauge(s) 54" detect a strain (e.g., a voltage signal) exerted on the head sidewalls 70*a*", 70*b*" and transmits the strain values to the measurement module 228.

Based on the detected strain values, the measurement module 228 calculates with the controller 62 the torque applied to the output member 30". The controller 62 instructs the display 240 to display information to the user (e.g., the calculated torque value). The measurement detection module 228 may additionally communicate relevant information including the torque value to an external device (not shown) via the wired and/or wireless connection (e.g., via the transceiver 86).

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more features and/or advantages of the invention may be set forth in the following claims:

What is claimed is:

1. A tool assembly configured to calibrate a torque wrench, the tool assembly comprising:

a tool including a head configured to be engaged and driven by a drive element of the torque wrench, a base configured to abut a reaction arm of the torque wrench when the head is engaged by the drive element, and an arm extending between the head and the base, wherein the tool is configured so that operation of the torque wrench when the head is engaged by the drive element forces the base against the reaction arm to apply a bending force on the tool;

a strain gauge configured to sense a strain exerted on the tool by the bending force; and an electronic processor in communication with the strain gauge and configured to calculate a torque based on the strain.

2. The tool assembly of claim 1, wherein the arm is formed as one piece with at least one of the head and the base.

3. The tool assembly of claim 2, wherein the arm is formed as one piece with the head and the base.

4. The tool assembly of claim 1, wherein the arm extends along an arm axis, and wherein the head includes an output member defining an output axis, the output member being arranged relative to the arm with the output axis substantially perpendicular to the arm axis.

5. The tool assembly of claim 1, wherein the arm extends along an arm axis, and wherein the base includes a projection extending along a projection axis and configured to engage the reaction arm, the projection being arranged relative to the arm with the projection axis substantially perpendicular to the arm axis.

6. The tool assembly of claim 1, wherein the arm has a wall extending between the head and the base, and wherein the strain gauge is coupled to and configured to sense a strain in the wall.

7. The tool assembly of claim 6, wherein the wall is a first wall, and the strain gauge is a first strain gauge, wherein the arm has a second wall spaced from the first wall, and wherein the tool assembly further comprises a second strain gauge coupled to and configured to sense a strain in the second wall.

8. The tool assembly of claim 1, wherein the head has a head wall, and wherein the strain gauge is coupled to and configured to sense a strain of the head wall.

9. The tool assembly of claim 8, wherein the head wall is a first head wall, and the strain gauge is a first strain gauge, wherein the head has a second head wall spaced from the first head wall, and wherein the tool assembly further comprises a second strain gauge coupled to and configured to sense a strain in the second head wall.

10. The tool assembly of claim 1, further comprising a measurement module having a module housing supporting the electronic processor.

11. The tool assembly of claim 10, wherein the measurement module includes a display supported on the module housing and in communication with the electronic processor, the display being configured to communicate information representative of a condition of the tool to a user.

12. The tool assembly of claim 10, wherein the measurement module includes communication components supported in the module housing and in communication with the electronic processor, the communication components being configured to communicate with an external device.

13. The tool assembly of claim 10, further comprising a case defining a storage space, the tool and the measurement module being supportable in the storage space.

14. The tool assembly of claim 13, wherein the case includes a panel, the tool being supported with the head and the base projecting through the panel to engage the torque wrench.

15. A calibration system configured to calibrate a torque wrench, the torque wrench including a housing, a fluid actuator, and a driver supported by the housing and driven by the fluid actuator, the calibration system comprising:

a tool assembly removably coupled to the torque wrench, the tool assembly including a working portion configured to engage the driver, a sensor configured to sense a condition on the tool assembly during calibration, and an electronic processor in communication with the sensor and configured to calculate a torque based on a sensed condition, an input of the torque wrench being adjustable based on the torque;

wherein the tool assembly includes a tool with a head providing the working portion, a base, and an arm extending between the head and the base, and wherein the arm has a wall extending between the head and the base, and wherein the sensor is coupled to the wall.

16. A calibration system configured to calibrate a torque wrench, the torque wrench including a housing, a fluid actuator, and a driver supported by the housing and driven by the fluid actuator, the calibration system comprising:

a tool assembly removably coupled to the torque wrench, the tool assembly including a working portion configured to engage the driver, a sensor configured to sense a condition on the tool assembly during calibration, and an electronic processor in communication with the sensor and configured to calculate a torque based on a sensed condition, an input of the torque wrench being adjustable based on the torque;

wherein the tool assembly includes a tool with a head providing the working portion, a base, and an arm extending between the head and the base, and wherein the head has a head wall, and wherein the sensor is coupled to the head wall.

17. The calibration system of claim 15, wherein the sensor includes a strain gauge configured to sense a strain exerted on the tool assembly, and wherein the electronic processor is in communication with the strain gauge and configured to calculate the torque based on a sensed strain.

18. The calibration system of claim 15, further comprising a measurement module having a module housing supporting the electronic processor.

19. The calibration system of claim 18, wherein the measurement module includes a display supported on the module housing and in communication with the electronic processor, the display being configured to communicate information representative of a condition of the tool assembly to a user.

20. The calibration system of claim 18, wherein the measurement module includes communication components supported in the module housing and in communication with the electronic processor, the communication components being configured to communicate with an external device.

21. The calibration system of claim 18, wherein the measurement module includes a power source supported by the module housing and operable to supply power to the electronic processor.

22. A tool assembly configured to calibrate a torque wrench, the tool assembly comprising:

a tool including a head, a base, an arm extending between the head and the base, and a strain gauge configured to sense a strain exerted on the tool; and an electronic processor in communication with the strain gauge and configured to calculate a torque based on a sensed strain, wherein the arm has a wall extending between the head and the base, and wherein the strain gauge is coupled to and configured to sense a strain in the wall.

23. The tool assembly of claim 22, wherein the wall is a first wall, and the strain gauge is a first strain gauge, wherein the arm has a second wall spaced from the first wall, and wherein the tool assembly further comprises a second strain gauge coupled to and configured to sense a strain in the second wall.

24. A tool assembly configured to calibrate a torque wrench, the tool assembly comprising:

a tool including a head, a base, an arm extending between the head and the base, and a strain gauge configured to sense a strain exerted on the tool; and an electronic processor in communication with the strain gauge and configured to calculate a torque based on a sensed strain, wherein the head has a head wall, and wherein the strain gauge is coupled to and configured to sense a strain of the head wall.

25. The tool assembly of claim 24, wherein the head wall is a first head wall, and the strain gauge is a first strain gauge, wherein the head has a second head wall spaced from the first head wall, and wherein the tool assembly further comprises a second strain gauge coupled to and configured to sense a strain in the second head wall.

26. A tool assembly configured to calibrate a torque wrench, the tool assembly comprising:

a tool including a head, a base, an arm extending between the head and the base, and a strain gauge configured to sense a strain exerted on the tool;

an electronic processor in communication with the strain gauge and configured to calculate a torque based on a sensed strain;

a measurement module having a module housing supporting the electronic processor; and a case defining a storage space, the tool and the measurement module being supportable in the storage space.

27. The tool assembly of claim 26, wherein the case includes a panel, the tool being supported with the head and the base projecting through the panel to engage the torque wrench.

28. The calibration system of claim 16, wherein the sensor includes a strain gauge configured to sense a strain exerted on the tool assembly, and wherein the electronic processor is in communication with the strain gauge and configured to calculate the torque based on a sensed strain.

29. The calibration system of claim 16, further comprising a measurement module having a module housing supporting the electronic processor.

30. The calibration system of claim 29, wherein the measurement module includes a display supported on the module housing and in communication with the electronic processor, the display being configured to communicate information representative of a condition of the tool assembly to a user.

31. The calibration system of claim 29, wherein the measurement module includes communication components supported in the module housing and in communication with the electronic processor, the communication components being configured to communicate with an external device.

32. The calibration system of claim 29, wherein the measurement module includes a power source supported by the module housing and operable to supply power to the electronic processor.

* * * * *